United States Patent [19]

Boyko et al.

[11] Patent Number: 4,833,934
[45] Date of Patent: May 30, 1989

[54] ROLLER WORM DRIVES AND ROLLER WHEELS FOR USE THEREIN

[75] Inventors: James G. Boyko, Amesbury, Mass.; George E. Brackett, Cape Elizabeth, Me.

[73] Assignee: Maxaxam Corporation, Dover, Del.

[21] Appl. No.: 909,265

[22] Filed: Sep. 18, 1986

[51] Int. Cl.[4] ............ F16H 1/16; F16H 55/22
[52] U.S. Cl. ............ 74/425; 74/458; 74/465; 384/454; 384/611
[58] Field of Search ............ 74/425, 427, 458, 464, 74/465, 440, 424.8 R, 441; 384/454, 615, 611

[56] References Cited

U.S. PATENT DOCUMENTS

| | | |
|---|---|---|
| 626,515 | 3/1899 | Whitney . |
| 767,588 | 8/1904 | Moakler ............ 74/464 |
| 874,342 | 12/1907 | Janson ............ 74/464 |
| 1,448,189 | 3/1923 | Brunner ............ 384/611 |
| 1,470,718 | 10/1923 | Forsyth ............ 74/464 |
| 1,580,055 | 4/1926 | Lax ............ 74/464 |
| 2,593,919 | 4/1952 | Reynolds ............ 384/611 |
| 3,766,788 | 10/1973 | Metz . |
| 3,766,800 | 10/1973 | Kennedy ............ 74/424.8 R |
| 3,820,413 | 6/1974 | Brackett ............ 74/465 |
| 3,875,817 | 4/1975 | Mayfield . |
| 4,008,625 | 2/1977 | Malhotra . |
| 4,274,296 | 6/1981 | Miller et al. ............ 74/441 |
| 4,651,586 | 3/1987 | Nemoto ............ 74/465 |
| 4,685,346 | 8/1987 | Brackett ............ 74/427 |

FOREIGN PATENT DOCUMENTS

| | | |
|---|---|---|
| 1041315 | 10/1958 | Fed. Rep. of Germany . |
| 658428 | 6/1929 | France ............ 74/465 |
| WO85/04228 | 9/1985 | PCT Int'l Appl. . |
| 912982 | 3/1982 | U.S.S.R. . |
| 237252 | 9/1926 | United Kingdom . |
| 728355 | 4/1955 | United Kingdom ............ 384/454 |
| 2115902 | 9/1983 | United Kingdom . |

OTHER PUBLICATIONS

"Worm Drive Roller Wheel Boosts Speed, Efficiency", Design News, issued Jan. 10, 1983, author E. J. Stefanides, pp. 88-89.

*Primary Examiner*—Allan D. Herrmann
*Attorney, Agent, or Firm*—Lerner, David, Littenberg, Krumholz & Mentlik

[57] ABSTRACT

In a worm wheel for a roller worm drive, each roller is movable along its axis relative to the body of the wheel, and biased towards an extended position by a spring. The springs are mounted in the space between inboard and outboard bearings associated with each roller, so as to conserve room within the roller wheel and hence permit use of large, robust, anti-friction bearings. In particularly preferred arrangements, the outboard anti-friction bearing can be used to limit outboard movement of each roller relative to the wheel body, and may also serve to transmit inboard-directed thrusts from the roller to the body via the biasing spring. The overall arrangement provides enhanced load carrying capacity and compactness in roller worm drives.

24 Claims, 3 Drawing Sheets

ROLLER WORM DRIVES AND ROLLER WHEELS FOR USE THEREIN

BACKGROUND OF THE INVENTION

The present invention relates to roller worm drives for mechanical power transmission and to roller worm wheels for use in such drives.

The conventional worm gear drive includes a worm screw and a wheel having teeth shaped to conform to the threads of the screw. As the worm screw rotates, its threads engage the teeth on the wheel and drive the wheel in rotation. With conventional worm gear drives, there is sliding motion, and hence considerable friction, between the surfaces of the screw threads and the surfaces of the teeth on the wheel. Such sliding friction results in considerable power loss.

As disclosed in U.S. Pat. No. 626,515, issued June 6, 1899, these frictional losses can be substantially eliminated if the wheel is provided with rollers rather than teeth. As taught by the '515 patent, the rollers may be arranged so that the axis of each roller extends substantially radially with respect to the axis of the worm wheel, and each roller may be mounted to the worm wheel by means of anti-friction bearings such as ball bearings. Each roller has a tip projecting outwardly from the body of the wheel. As the worm screw rotates, the screw thread surfaces engage the tips of successive rollers and drive the wheel in rotation. Because each roller is free to rotate its own axis about relative to the worm wheel, there is substantially no sliding friction between the roller tips and the screw thread surfaces.

Despite the manifest advantages afforded by such roller worm drives in eliminating sliding friction, these drives have not been widely adopted heretofore. Roller worm drives heretofore have not provided power transmission capacity competitive with the capacity of conventional worm drives of comparable size. The power transmission capacity of a roller worm drive ordinarily is limited by the load carrying capacity of the anti-friction bearings connecting the rollers with the body of the wheel. The size and hence the load carrying capacity of the bearings is limited by the space available in the wheel for mounting the bearings.

Notably, roller worm drives having a single set of radially arranged rollers heretofore have been unsuitable for use in automotive final drive systems. It has been impracticable heretofore to provide such roller worm drives with the required power transmission capacity without making the roller worm drive so large as to exceed the available space in the vehicle.

One useful solution to this problem is taught by U.S. Pat. No. 4,685,346 and by the corresponding International Patent Publication WO 85/04228, published Sept. 26, 1985. As set forth therein, two sets of angularly arranged rollers may be provided rather than a single set of radially arranged rollers. The angularly arranged rollers are disposed so that the rollers of one set project in one direction along the axis of the worm wheel, whereas the rollers of the other set project in the opposite direction along the axis of the worm wheel. The rollers of the two sets are staggered, so that each roller of one set is disposed between rollers of the other set. Because the rollers are angularly arranged in this fashion, the anti-friction bearings mounting each roller to the worm wheel are spaced along the roller axis from the anti-friction bearings mounting the immediately adjacent rollers to the body of the worm wheel. This arrangement substantially increases the space available for the anti-friction bearings in a wheel of given size, and hence substantially increases the power transmission capacity which may be provided with a roller wheel of given diameter.

As also disclosed in the '228 Publication each roller may be mounted for sliding movement over a limited range along its own axis relative to the body of the wheel. Biasing springs can be provided for urging the roller outwardly with respect to the wheel, into engagement with the thread of the screw. With this arrangement, any individual roller which may be overloaded will be forced inwardly relative to the body of the wheel. This arrangement thus provides for equal sharing of transmitted loads between a plurality of rollers simultaneously in mesh with the threads of the screw despite any minor inaccuracies in the device, and hence provides still further improvements in load carrying capacity. However, in the construction disclosed by the '228 Publication, the biasing springs, the thrust bearings associated therewith and the retaining rings employed to limit outward movement of the rollers all consume appreciable space within the roller wheel. These additional elements thus undesirably reduce the space available for the bearings.

Thus, although worm drive systems according to the '228 Publication provide significant improvements in roller worm drives, there has been need for further improvement.

SUMMARY OF THE INVENTION

The present invention provides roller wheels and roller worm drives which address those needs. One aspect of the present invention provides a roller wheel having spring biased, axially-movable rollers which permit load sharing in an improved arrangement which substantially eliminates the loss of valuable bearing space heretofore caused by the biasing springs and related elements. This improvement permits substantial increases in the load carrying capacity of the bearings which can be accommodated in a roller wheel of given size. The present invention thus provides greater power transmission capacity in a roller worm drive of given size or, conversely, a more compact roller worm drive for a given power transmission capacity.

The present invention can provide these improvements either in a worm wheel having angularly arranged rollers or in a worm wheel having radially disposed rollers. However, the improvements are particularly significant in the case of roller wheels having radially disposed rollers. A roller wheel according to the present invention having a single set of radially arranged rollers, and a roller worm drive according to the present invention incorporating such a worm wheel, can provide the load carrying capacity and compactness required in an automotive final drive system.

A roller wheel according to the present invention preferably includes a body defining a body axis and a plurality of rollers carried on the body. Each roller has a roller axis extending in inboard and outboard directions towards and away from the body axis. At its outboard end, each roller has a tip. Outboard and inboard anti-friction bearings are associated with each roller, the outboard bearings being disposed inboard of the tip surfaces and the inboard bearings being disposed inboard of the outboard bearings. These bearings support the rollers on the body so that each roller is rotatable about its roller axis relative to the body. Each roller is also movable in the inboard and outboard directions along its roller axis relative to the body.

A spring is associated with each roller for biasing the associated roller in the outboard direction along its axis relative to the body. The spring associated with each roller is disposed between the inboard and outboard bearings associated with the roller. Preferably, each spring is closely juxtaposed with the portion of the associated roller disposed between the inboard and outboard bearings. Thus, each spring preferably lies in the space immediately surrounding the associated roller between the bearings. In particularly preferred arrangements, each spring includes a washer spring such as a generally frustoconical or Belville washer which encircles the associated roller between the inboard and outboard bearings. The springs thus occupy space between the bearings which heretofore was simply wasted. Accordingly, additional space within the worm wheel is available for the bearings. Because the biasing springs do not occupy space inboard of the inboard bearings, these bearings can be disposed as far as possible from the outboard bearings and the tips of the rollers. As explained below, this further enhances the load carrying capacity of the bearings.

Appropriate retention means are also associated with each roller for limiting movement of the roller the outboard direction along its roller axis relative to the body, and thrust means are associated with each roller for transmitting inboard directed forces from the roller through the associated spring to the body while permitting rotation of the roller relative to the body. Preferably, the retention means and thrust means associated with each roller are disposed outboard of the associated inboard bearing.

In a roller wheel according to one embodiment of the present invention, each outboard bearing has an external race fixed to the body of the wheel. Each roller is movable in the inboard and outboard directions relative to the associated inboard and outboard bearings, and each roller includes a flange projecting transversely of its roller axis between the inboard and outboard bearings. The external race of the outboard bearing engages the flange to limit outboard movement of the roller. Thus, the outboard bearing and flange serve as elements of the retention means. This arrangement avoids the need for separate retaining elements adjacent the inboard end of each roller as typically utilized heretofore and hence saves additional space at the inboard end of the roller, where space is particularly limited. The thrust means associated with each roller may include an anti-friction thrust bearing formed separately from the inboard and outboard bearings, the thrust bearing also being disposed in the space between the inboard and outboard bearings. Each spring may be engaged between the thrust bearing and roller. In one arrangement, the spring is a frustoconical washer spring disposed outboard of the thrust bearing and inboard of the flange, so that the spring is compressed between the flange on the roller and the thrust bearing by inboard directed forces. The inboard and outboard bearings may be cylindrical roller bearings, and cylindrical surfaces on each roller may constitute the internal races of these roller bearings.

In a further, particularly preferred embodiment of the present invention, the thrust means may include the outboard bearings. Thus, each outboard bearing may include an internal race fixed to the associated roller, an external race mounted to the body for movement in inboard and outboard directions and anti-friction elements interposed between these races, the anti-friction elements being arranged to transmit inboard directed forces from the internal race to the external race. Each of the springs may be engaged between the body and the external race of the associated outboard bearing. This arrangement provides even greater compactness and reduced cost, inasmuch as the separate thrust bearing is entirely eliminated. In a particularly preferred arrangement, each outboard bearing is a ball bearing.

Preferably, the anti-friction elements of each outboard bearing are also arranged to transmit inboard-directed forces from its external race to its internal race and hence to the roller. Stop means may be provided for limiting movement of the external race of each outboard bearing in the outboard direction relative to the body. Thus, each outboard bearing and also serves as an element of the retention means.

These and other objects, features and advantages of the present invention will be more readily apparent from the detailed description of the preferred embodiments set forth here below, taken in conjunction with the accompanying drawings.

DETAILED DESCRIPTION OF THE PREFERRED EMBODIMENT

Figure 1:
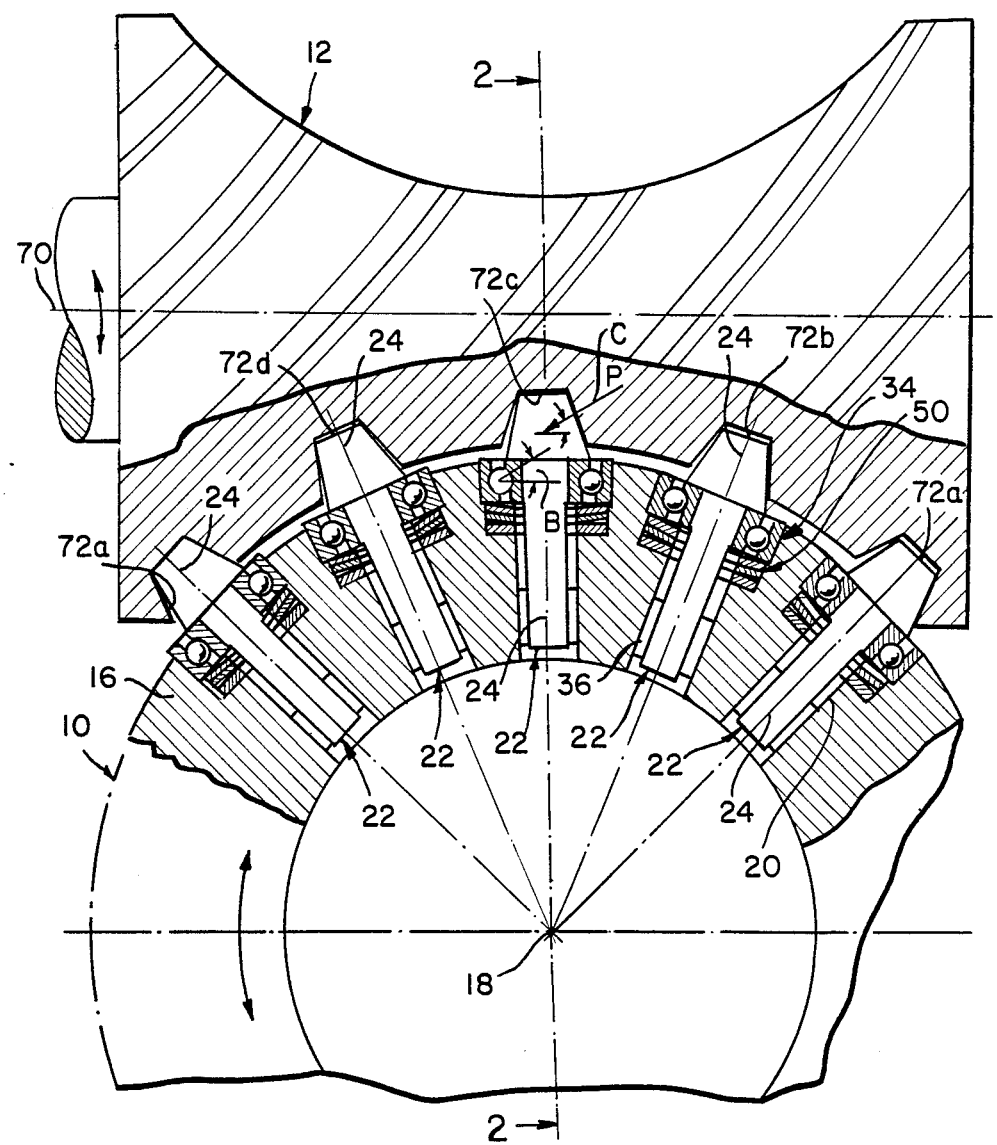
FIG. 1 is a fragmentary, schematic, sectional view of a roller worm drive according to one embodiment of the present invention.
Figure 2:
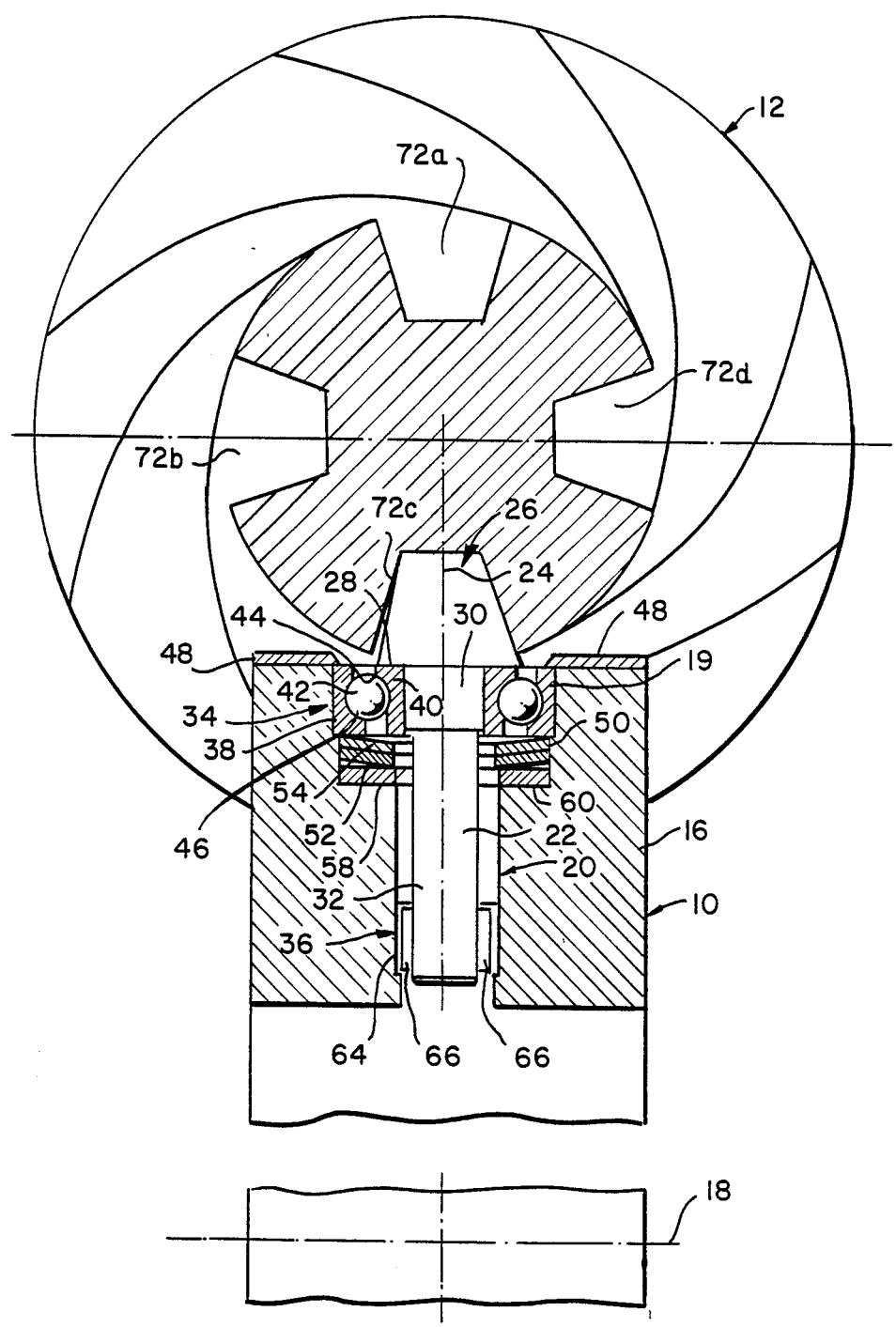
FIG. 2 is a schematic sectional view taken along line 2—2 in FIG. 1.

A roller worm drive according to one embodiment of the present invention, depicted in FIGS. 1 and 2, includes a roller wheel 10 and a worm screw 12. The roller wheel 10 includes a body 16 defining a body axis 18. The body is mounted for rotation about body axis 18 by appropriate bearings (not shown) or equivalent means. A plurality of stepped bores 20, each having an enlarged mouth portion 19 remote from body axis 18, are formed in body 16, the bores being disposed in a common plane and extending substantially radially with respect to body axis 18, the bores being spaced at equal intervals about the periphery of the body 16.

A plurality of rollers 22 are carried on body 16. Each roller is in the form of a body of revolution of about a roller axis 24. The rollers are received in bores 20 so that the roller axes 24 extend radially with respect to body axis 18. Directions and locations along each roller axis 24 are specified herein as either "inboard" or "outboard". As used herein, the term "inboard" means the direction along the roller axis towards body axis 18, whereas the direction "outboard" is the opposite direction, away from the body axis. Each roller 22 has, at its outboard end, a tip 26 defining a tip surface which is a surface of revolution about roller axis 24. A shoulder 28 extending transversely to roller axis 24 and facing in the inboard direction is provided at the inboard end of each tip 26. Each roller also includes a cylindrical portion 30 of smaller diameter than the inboard end of tip 26 and projecting inboard from shoulder 28. A further, elongated cylindrical shank 32 projects inboard from portion 30.

Each roller 22 is supported on body 16 by an outboard bearing 34 and an inboard bearing 36 associated with the roller. Each outboard bearing 34 includes an external race 38. Each outboard bearing also includes an internal race 40 and spherical anti-friction elements 42 interposed between races 40 and 38. Outboard bearings 34 are ball bearings, preferably angular-contact ball bearings. The anti-friction elements 42, and the races 38 and 40 of each outboard bearing are arranged so that the anti-friction elements 42 can transmit substantial inboard-directed forces (forces directed toward the bottom of the drawing in FIG. 2) from the inner race 40 to the outer race 38. Thus, the surface 44 of the internal race 40 in contact with anti-friction elements 42 extends outwardly away from the central axis of the bearing and hence away from roller axis 24 on the outboard side of the anti-friction elements, whereas the surface 46 of external race 38 in contact with the anti-friction elements projects inwardly towards the central axis of the bearing and hence towards roller axis 24 on the inboard side of the anti-friction elements. Each outboard bearing 34 is also arranged to transmit inboard-directed forces from its external race 38 to its internal race 40. Thus, the contact surface 44 of the inner race 40 also projects outwardly, away from axis 24 on the inboard side of anti-friction elements 42, whereas the contact surface 46 of external race 38 projects inwardly, towards axis 24 on the outboard side of the anti-friction elements or balls.

The external race 38 of each outboard bearing is slidably received in the mouth portion 19 of the associated bore 20, whereas the internal race 40 of each outboard bearing is press-fit to the cylindrical portion 30 of the associated roller. Inboard-facing shoulder 28 on each roller bears on the outboard-facing surface of associated internal race 40. Stop elements 48 (FIG. 2) on body 16 slightly overlap the outboard face of the external race 38 of each outboard bearing. These stop elements are remote from the tips 26 of the rollers, the stop elements being spaced apart from the tips in the directions parallel to body axis 18, i.e., to the left and right as seen in FIG. 2. The stop elements limit movement of the external races 38 relative to body 16, and hence retain the outboard bearings on the body. Because the rollers are press-fit to the internal races 40 of the outboard bearings, and because each outboard bearing can transmit inboard-directed forces from its external race to its internal race, the outboard bearings cooperate with the stop elements 48 to limit the outboard movement of the rollers.

A composite spring assembly 50 is juxtaposed with each outboard bearing 34. Each spring assembly 50 includes two nested frustoconical spring washers 52 and 54 of the type commonly referred to as belville washers encircling the shank 32 of the associated roller 22. These washers are disposed so that the base of the frustum defined by each washer faces in the outboard direction. The base of the outboard spring washer 54 directly contacts the inboard face of the associated outboard bearing external race 38, whereas the apex of inboard washer spring 52 bears on body 16 through an intermediate washer 58. Intermediate washer 58 in turn rests on a shoulder 60 formed in bore 20 at the inboard end of mouth portion 19. Thus, each spring assembly 50 is interposed between the associated outboard bearing 38 and body 16 so that each spring biases the associated outboard bearing, and hence the associated roller 22 in the outboard direction. Inboard-directed forces applied to each roller will be transmitted to the body through the associated outboard bearing 34 and spring assembly 50.

Each of the spring washers 52 and 54 immediately encircles the associated roller 20. That is, the spring washers confront the surface of roller 22 with no additional structural element therebetween. Thus, the spring washers are disposed as closely as is practicable to the shank 32 of the associated roller without actually contacting the shank.

Each inboard bearing 36 includes an external race 64 in the form of a drawn cup and a plurality of needle-like cylindrical anti-friction elements 66 received within the external race 64. The shank portion 32 of the associated roller 22 is disposed between the cylindrical anti-friction elements 66 in rolling contact therewith, so that the shank portion 32 of each roller 22 serves as the internal race of the associated inboard bearing 36. The external race of each inboard bearing 36 is press-fit within the associated bore 20. Each roller is movable in the inboard and outboard directions along its axis relative to the anti-friction elements or needles 66 and external race 64 of the associated inboard bearing 36.

As seen in FIG. 1, the roller wheel 10 is in mesh with the worm screw 12. The worm screw is an enveloping type worm screw having generally an hourglass shape defined by a surface of revolution about a screw axis 70. The screw has 4 separate helical threads or 72A, 72B, 72C and 72D in its exterior surface. The tips 26 of rollers 22 are meshed in these threads. The screw is supported for rotation about screw axis 70 by bearings (not shown) or equivalent means. Upon rotation of the screw about the screw axis 70, the interengagement of threads 72 with the rollers forces the roller wheel to rotate about the body axis 18. As the wheel rotates, at least four rollers are always engaged with the screw threads.

As the screw 12 rotates, forces are transmitted between the screw and the roller wheel body via the roller tips. The forces applied by the screw thread surfaces to each roller tip are directed approximately normal to the tip surface, and hence are directed at a predetermined angle relative to the roller axis. As used in this disclosure with reference to a roller wheel or roller worm drive, the term "pressure angle" refers to the angle, such as the angle P depicted in FIG. 1, defined between a line normal to the tip surface and a plane normal to the roller axis 24. Forces applied by the screw to each roller typically are applied over a substantial contact area therebetween, but may be taken as applied through a point C corresponding to the center of the contact area between the roller and screw thread surfaces.

As will be appreciated from a balance of moments taken on each roller 22 about its inboard end, the component of the force applied through each outboard bearing to the associated roller in the direction transverse to the roller axis must necessarily be somewhat greater than the corresponding component of the force applied by the screw to the roller tip. As the inboard bearings do not transmit inboard or outboard-directed forces between the rollers and the body, component of force applied to the roller through the outboard bearing in the outboard direction is equal to the inboard-directed component applied by the screw to the roller. Thus, the net force transmitted through each outboard bearing must necessarily be directed at a slightly greater angle to the roller axis than the force applied by the screw to the roller. Each outboard bearing may, if desired, be arranged with an appropriate contact angle B (FIG. 1) to maximize its life under these conditions.

The spring assemblies 50 are preloaded in compression. In the normal extended position illustrated, with the external race 38 of each outboard bearing resting against stop elements 48, each spring assembly is preloaded, under significant compression, and hence exerts a substantial outboard-directed force on the associated outboard bearing to hold the same against the stop elements. Any inboard movement of any of the rollers 22 outboard bearings 48 will necessarily require further compression of the associated spring washers 52 and 54.

The preload on the spring assemblies aids in preventing cracking at the springs under the dynamic loads encountered in service.

Preferably, the preload force is slightly less than the maximum inboard-directed force expected in normal service, so that each roller and the associated outboard bearing move slightly inboard, away from stop elements 48, under normal loads. The spring rate of spring assemblies 50 is selected so that this normal movement is not enough to fully compress the spring assemblies. Accordingly, there is room for additional deflection of the spring assemblies in the event of overload. Deflection of the spring assemblies during normal or overload service assures that the rollers in engagement with the screw will share the load.

As best appreciated with reference to FIG. 1, the roller axes 24 necessarily converge with one another in the inboard direction. Thus, the space available for components associated with each roller necessarily becomes progressively smaller adjacent the inboard end of each roller. As will be understood from a balance of moments about the inboard end of any roller, in the plane of FIG. 1, it is desirable to mount the inboard and outboard bearings at the greatest possible distance from one another so as to minimize the loads on those bearings. By positioning the springs 50 between the inboard and outboard bearings, the structure illustrated in FIGS. 1 and 2 places these springs in a space which heretofore has been wasted in a spring-loaded roller wheel design. Moreover, because the springs are placed adjacent the outboard bearings, and hence adjacent the outboard end of the associated pin, there is no difficulty in accommodating springs of substantial size. This in turn minimizes the stress prevailing in the springs and thereby provides substantially unlimited spring fatigue life.

A further significant advantage of this arrangement is that it provides all of the desirable attributes mentioned above while also minimizing the polar moment of inertia of each roller, and the elements fixed thereto, about the roller axis. During operation of the worm drive, each roller engaged with the screw spins about its roller axis so that the velocity of the tip surface matches the velocity of the thread surface for rolling contact therebetween. As the roller wheel turns, and a roller which was previously out of engagement becomes engaged with the thread, that roller must be accelerated in rotation about its axis by forces transmitted from the thread. Because the accelerating roller is not yet turning at the required angular velocity for rolling contact, there is sliding contact between the tip surface and the thread surface during acceleration. The amount of friction and wear associated with such sliding contact are directly related to the polar moment of inertia of each roller and associated elements about its roller axis.

In the embodiment illustrated in FIGS. 1 and 2, the polar moment of inertia of each roller and associated elements is minimized by keeping all portions of the roller, and all structures fixed to the roller, as close as practicable to the roller axis. As most clearly seen in FIG. 2, no portion of roller 22, and no portion of internal race 40, extends further from roller axis 24 than the roller tip 26.

Yet another advantage achieved by the arrangement of FIGS. 1 and 2 is the use of otherwise wasted space for the stop elements 48. As shown in FIG. 2, placement of these elements spaced from the rollers in directions parallel to body axis 18 allows these stop elements to protrude from the body 16 without interfering with the screw. Although separately formed stop elements 48 are illustrated, the same advantage is provided if the stop elements are formed integrally with the body 16. This can be done where body 16 is formed in two halves split along the plane of the roller axes, the halves being fastened to one another after the rollers and associated elements are inserted in the body.

Figure 3:
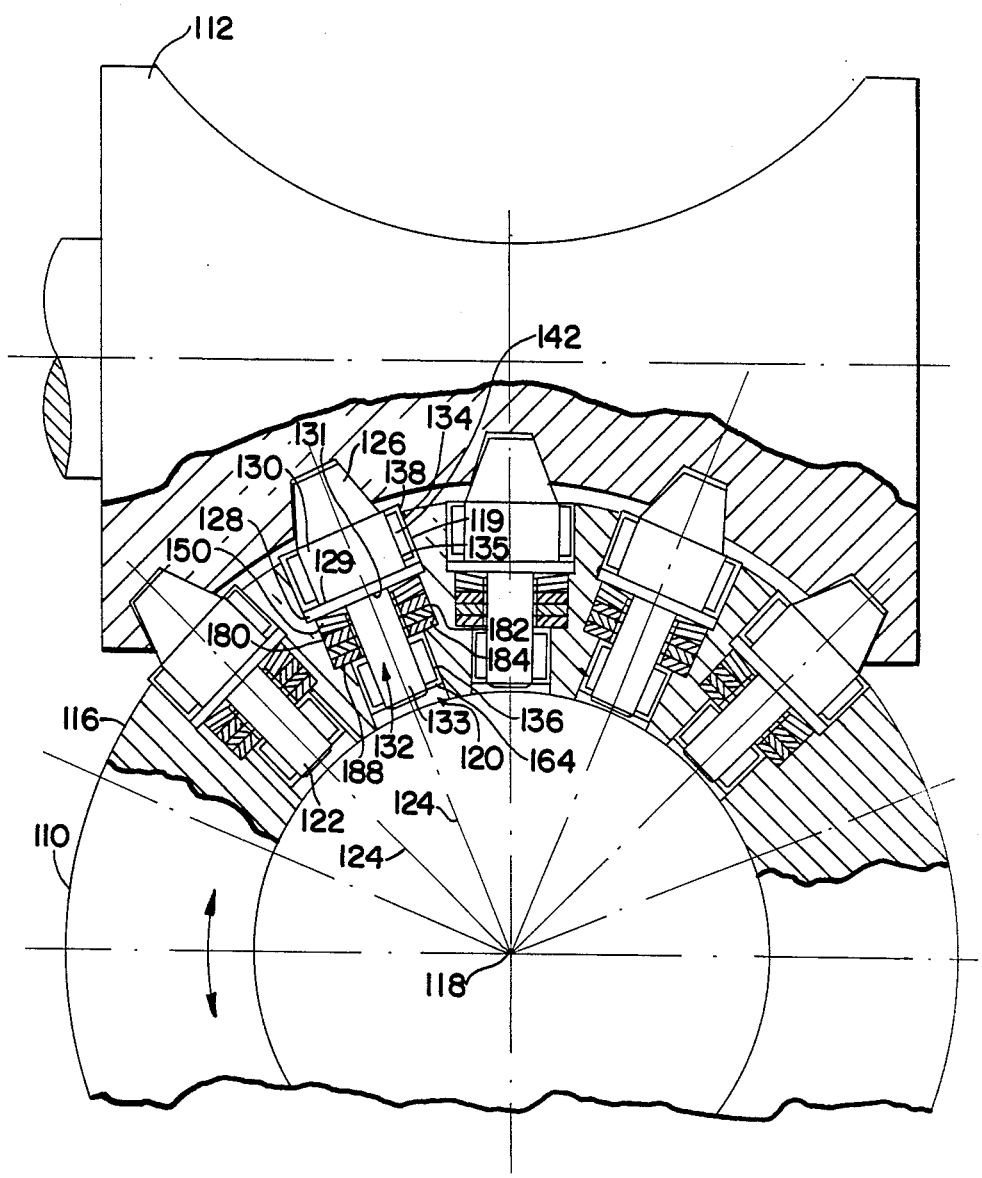
FIG. 3 is a view similar to FIG. 1 but depicting a roller worm drive according to a further embodiment of the present invention.

A worm drive system according to a further embodiment, illustrated in FIG. 3, includes a worm screw 112 substantially similar to that illustrated in FIGS. 1 and 2, and a roller wheel 110 having a body 116 defining a body axis 118. Roller wheel 110 has rollers 122 disposed on the wheel in an overall arrangement similar to that of the wheel shown in FIG. 1. Thus, the roller axes 124 of these rollers likewise are disposed in a single plane, and extend radially with respect to body axis 118. In the embodiment according to FIG. 3, however, each roller 122 has a cylindrical outboard bearing surface 130 disposed immediately inboard of the roller tip 126, and an integral circular flange 128 projecting transversely of the roller axis immediately inboard of the cylindrical outboard bearing surface 130. Each roller 122 also has an elongated cylindrical shank 132 defining an inboard cylindrical bearing surface 133 and projecting in the inboard direction from flange 128. The outboard and inboard bearing surfaces 130 and 133, flange 128 and the surface of tip 126 of each roller are concentric with one another and are centered on the roller axis 124 of the roller.

Each roller has associated with it an outboard anti-friction bearing 134 and an inboard anti-friction bearing 136. The inboard anti-friction bearing is similar to the inboard bearings utilized in the aforementioned embodiment, and has an external race 164 press-fit within the associated bore 120 in body 116. Each inboard bearing has needle-like anti-friction elements in rolling contact with the inboard bearing surface 133 of the associated roller, and also in rolling contact with the external race. Thus, the shank 132 of each roller serves as the internal race of the associated inboard bearing 136. Each roller is free to move along its axis, in the inboard and outboard directions, relative to the needles or anti-friction elements and external race of the associated inboard bearing.

An outboard anti-friction bearing 134 is also provided for each roller. Each outboard bearing has an external race 138 and needle-like anti-friction elements 142 which are in rolling contact with the external race and with the outboard bearing surface 130 of the associated pin, so that the outboard bearing surface of each pin serves as the internal race of the associated outboard bearing. The external race 138 of each outboard bearing in the embodiment of FIG. 3 is press-fit within the mouth portion 119 of the associated bore 120 in body 116. The needle-like anti-friction elements 142 of the outboard bearings do not transmit inboard or outboard directed loads between the associated roller and external race. Thus, each roller is free to move in the inboard and outboard directions relative to the external race of the associated bearing, and hence relative to body 116.

The external race 138 of each outboard bearing has a lip 135 projecting inwardly, towards the roller axis 124 of the associated roller, and this lip confronts the outboard face 129 of flange 128. Thus, the external race of each outboard bearing cooperates with the flange 128 of the associated roller to limit outboard movement of the roller.

A spring assembly 150, generally similar to the spring assemblies employed in the arrangement of FIGS. 1 and 2, is disposed immediately inboard of each flange 128. A thrust bearing 182 is disposed inboard of each spring assembly 150. Each thrust bearing 182 includes a circular, washer-like outboard race 180, a circular washer-like inboard race 184 and a plurality of needle-like anti-friction elements 186 disposed between races 180 and 184 in rolling contact therewith. The inboard shoe 184 of each thrust bearing bears on a shoulder 188 in the associated bore 120. The outboard side of each spring assembly bears on the inboard face 131 of the associated flange adjacent the periphery thereof, whereas the inboard side of the spring assembly bears on the outboard race 180 of thrust bearing 182. Thus, inboard directed forces on each roller are transmitted from the roller to the body 116 via the flange 128 of the roller, the associated spring assembly 150 and the associated thrust bearing 182. Each spring assembly serves to bias the associated roller in the outboard direction so that the spring assemblies 150 provide a load-equalizing function similar to that described above. However, the spring assemblies 150 in this embodiment are not preloaded; the spring rates of assemblies 150 are selected so that when a roller is subjected to the normal inboard directed thrust load expected in service, the roller moves slightly inboard to a partially retracted position. Thus, while each roller is engaged by the screw, the outboard surface 129 of its flange 128 is just clear of the lip 135 on the associated thrust bearing. Accordingly, each roller is free to rotate while it is in engagement with the threads on the worm screw 112.

The embodiment illustrated in FIG. 3 also offers space utilization advantages. Thus, the spring assemblies 150 are disposed in the space immediately surrounding each roller between the inboard and outboard bearings, which space would otherwise be unused. Further, use of outboard bearing elements such as the lip 135 as a part of the retaining means which limits outboard movement of each pin obviates a need for retaining elements adjacent the inboard end of each roller, where the available space is particularly scarce. Moreover, use of the outboard bearing as an element of the retaining means allows use of a flange integral with the roller while also permitting use of an outboard bearing having a greater diameter than the inboard bearing. Because the flange 128 is disposed between the inboard and outboard bearings for engagement with the outboard bearing, the bearings can be assembled to the roller from opposite ends thereof.

The use of an outboard bearing having a greater diameter than the inboard bearing is particularly desirable inasmuch as the outboard bearing ordinarily carries a far greater load transverse to the roller axis than does the inboard bearing. As used herein, the "diameter" of an anti-friction bearing is the largest diameter of the internal race.

As pointed out above, the roller worm wheels and roller worm drives according to the present invention can provide marked improvement in load carrying capacity vis-a-vis the arrangements heretofore utilized. The improvement afforded by the present invention is particularly significant in the case of worm wheels incorporating a single row of radially arranged rollers, as illustrated in FIGS. 1-3, and is especially significant in applications requiring both compactness and high load carrying capacity. In particular, the improvement afforded by the present invention permits use of a roller wheel having a single row of radially arranged rollers in a worm drive having the requisite combination of compactness and load carrying capacity for automotive final drive applications. Such automotive final drive applications normally require a speed ratio between about 2.5:1 and about 4.5:1, preferably between about 3:1 and about 4:1 between the screw and wheel, and typically require that the distance from the screw axis to the body axis of the roller wheel be about 13 cm or less. Such drive should have a life of at least about $3 \times 10^8$ revolutions of the roller wheel about the body axis while transmitting 22 kw at 3000 rpm. Preferably, the maximum Hertz or contact stress at the zones of contact between rolling elements in the anti-friction bearings should be less than about $2.07 \times 10^6$ KPa upon application of a torque of about 71 N-M to the worm about the worm axis.

To meet these parameters, the roller wheel should desirably include at least about 10, preferably at least about 12 and more preferably at least about 16 rollers and should have a pitch diameter of less than about 25.4 cm.

The degree to which a worm drive combines the desirable attributes of compactness and high load carrying capacity can also be stated in terms of a "figure of merit" calculated according to the following formula:

$$F_m = T/D_c$$

where:

$F_m$ is the figure of merit;

$D_c$ is the centerline distance from the body axis of the roller wheel to the axis of the worm screw; and T is the maximum torque which can be applied to the worm screw while still obtaining a life equal to or greater than $3 \times 10^8$ revolutions of the roller wheel.

Preferred roller worm drives according to the present invention have a figure of merit at least about 56 N−M/M.

Numerous variations and combinations of the features described above can be employed according to the present invention. Merely by way of example, in each of the embodiments described above, each roller is movable in the inboard and outboard directions relative to the anti-friction elements and external race of the associated inboard bearing. However, the inboard bearing may be a bearing which does not permit such relative movement, such as a ball bearing. In this case, the external race of the inboard bearing can be mounted for inboard and outboard movement relative to the roller wheel body. Also, in the embodiment of FIGS. 1 and 2, each of the outboard bearings has an internal race formed separately from the roller itself but fixed to the roller by press-fitting or the like. Manifestly, the inboard race of the outboard bearing can be fixed to the roller by forming the inboard race integrally with the remainder of the roller. Also, in the embodiment of FIGS. 1 and 2, a washer 60 interposed between the spring assembly and the body. If the body itself is formed from a relatively hard material, this washer can be omitted. Further, although each of the spring assemblies depicted in the present drawings incorporates plural Belville type frustoconical washers, spring assemblies incorporating other forms of springs and incorporating only a single spring can also be employed. Also, tapered roller bearings can be substituted for the ball bearings in embodiments as shown in FIGS. 1 and 2. As these and other variations and combinations of the features described above can be used, the foregoing description of the preferred embodiment should be taken by way of illustration rather than by way of limitation of the present invention as defined by the claims.

What is claimed is:

1. A roller wheel for use in a worm drive comprising:
   (a) a body defining a body axis;
   (b) a plurality of rollers carried on said body, each roller having a roller axis extending in inboard and outboard directions towards and away from said body axis, respectively, each roller having a tip at its outboard end;
   (c) an outboard anti-friction bearing and an inboard anti-friction bearing associated with each of said rollers, said outboard bearings being disposed inboard of said tips, said inboard bearings being disposed inboard of said outboard bearings, said inboard and outboard bearings supporting said rollers on said body so that each said roller is rotatable about its roller axis relative to said body, each said roller being movable in said inboard and outboard directions relative to said body;
   (d) a spring associated with each said roller and disposed between said associated inboard and outboard bearings, each said spring biasing the associated roller in said outboard direction along its roller axis relative to said body;
   (e) retention means associated with each said roller for limiting movement of the roller in the outboard direction relative to said body; and
   (f) thrust means associated with each said roller for transmitting inboard directed forces from the roller through said associated spring to said body while permitting rotation of the roller relative to the body, each said retention means being disposed entirely outboard of the associated inboard bearing.

2. A roller wheel as claimed in claim 1 in which each said thrust means is disposed entirely outboard of the associated inboard bearing.

3. A roller wheel as claimed in claim 1 in which each of said outboard bearings includes an external race fixed to said body, each of said rollers includes a flange projecting transversely of the roller axis between the associated inboard and outboard bearings and engaging the external race of the associated outboard bearing, said retention means including said flanges and said external races.

4. A roller wheel as claimed in claim 3 in which said thrust means associated with each said roller includes an anti-friction thrust bearing engaged with the associated one of said springs.

5. A roller wheel as claimed in claim 4 in which each said spring is engaged between the associated thrust bearing and the associated roller.

6. A roller wheel as claimed in claim 5 in which each said spring includes a compression spring disposed outboard of the associated thrust bearing.

7. A roller wheel as claimed in claim 6 in which each said flange defines an inboard face and each said compression spring is a washer spring bearing on said inboard face of the flange on the associated roller.

8. A roller wheel as claimed in claim 3 in which said body has a bore associated with each said roller and the external race of each said outboard bearing is press-fit within one of said bores.

9. A roller wheel as claimed in claim 3 wherein said outboard and inboard bearings are cylindrical roller bearings.

10. A roller wheel as claimed in claim 9 in which each said roller has inboard and outboard cylindrical surfaces constituting interior races of the associated inboard and outboard bearings.

11. A roller wheel as claimed in claim 2 in which said thrust means include said outboard bearings.

12. A roller wheel as claimed in claim 11 in which each said outboard bearing includes an internal race fixed to the associated roller, an external race mounted to said body for movement in said inboard and outboard directions along the roller axis of the associated roller, and anti-friction elements interposed between said races, said anti-friction elements being arranged to transmit inboard-directed forces from the internal race to the external race, each said spring being engaged between said body and the external race of the associated outboard bearing.

13. A roller wheel as claimed in claim 12 in which each said spring includes an outboard spring washer encircling the associated roller and bearing directly on the external race of the associated outboard bearing.

14. A roller wheel as claimed in claim 13 in which each said outboard spring washer is generally frustoconical, the base of each said outboard frustoconical spring washer contacting the external race of said associated outboard bearing.

15. A roller wheel as claimed in claim 12 in which each said outboard bearing is a ball bearing.

16. A roller wheel as claimed in claim 1 in which said roller axes extend in a common plane perpendicular to said body axis.

17. A roller wheel as claimed in claim 16, in which said roller axes extend substantially radially with respect to said body axis.

18. A roller worm drive comprising a roller wheel as claimed in claim 16 and a worm screw in mesh with said rollers, the drive having a figure of merit of at least about 56 N−M/M.

19. A roller worm drive comprising a roller wheel as claimed in claim 16 and a worm screw in mesh with said rollers, to provide a ratio of about 2.5:1 to about 4.5:1, the axis of said worm screw being less than about 13 cm from said body axis.

20. A drive as claimed in claim 19 having a maximum Hertz stress of less than about $2.07 \times 10^6$ KPa upon application of a torque of about 71 N−M to said worm.

21. A drive as claimed in claim 19 having a life at at least $3 \times 10^8$ revolutions of said roller wheel about said body axis while transmitting 22 KW at 3000 rpm.

22. A roller wheel as claimed in claim 1 wherein each said spring immediately encircles the associated roller so that each said spring confronts the circumferential surface of the associated roller with no additional structural element therebetween.

23. A roller wheel for use in a worm drive comprising:
(a) a body defining a body axis;
(b) a plurality of rollers carried on said body, each roller having a roller axis extending in inboard and outboard directions towards and away from said body axis, respectively, each roller having a tip at its outboard end;
(c) an outboard anti-friction bearing and an inboard anti-friction bearing associated with each of said rollers, said outboard bearings being disposed inboard of said tips, said inboard bearings being disposed inboard of said outboard bearings, said inboard and outboard bearings supporting said rollers on said body so that each said roller is rotatable about its roller axis relative to said body, each said roller being movable in said inboard and outboard directions relative to said body;
(d) a spring associated with each said roller and disposed between said associated inboard and outboard bearings, each said spring biasing the associated roller in said outboard direction along its roller axis relative to said body;
(e) retention means associated with each said roller for limiting movement of the roller in the outboard direction relative to said body; and
(f) thrust means associated with each said roller for transmitting inboard directed forces from the roller through said associated spring to said body while permitting rotation of the roller relative to the body, each said thrust means being disposed entirely outboard of the associated inboard bearing, said thrust means including said outboard bearings, each said outboard bearing including an internal race fixed to the associated roller, an external race mounted to said body for movement in said inboard and outboard directions along the roller axis of the associated roller, and anti-friction elements interposed between said races, said anti-friction elements being arranged to transmit inboard-directed forces from the internal race to the external race, each said spring being engaged between said body and the external race of the associated outboard bearing, said anti-friction elements of each said outboard bearing being arranged to transmit inboard-directed forces from the external race to the internal race of the bearing, said retention means including said outboard bearings and stop means for limiting movement of the external race of each outboard bearing in the outboard direction.

24. A roller wheel as claimed in claim 23 in which said stop means includes stop elements disposed outboard of the external races of said outboard bearings and spaced apart from said roller axes in the direction of said body axis.

* * * * *